US011018943B1

(12) United States Patent
Vasseur et al.

(10) Patent No.: US 11,018,943 B1
(45) Date of Patent: May 25, 2021

(54) LEARNING PACKET CAPTURE POLICIES TO ENRICH CONTEXT FOR DEVICE CLASSIFICATION SYSTEMS

(71) Applicant: Cisco Technology, Inc., San Jose, CA (US)

(72) Inventors: Jean-Philippe Vasseur, Saint Martin d'uriage (FR); David Tedaldi, Zurich (CH); Grégory Mermoud, Veyras VS (CH); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/878,931

(22) Filed: May 20, 2020

(51) Int. Cl.
*H04L 12/24* (2006.01)
*H04L 12/26* (2006.01)
*G06N 20/00* (2019.01)
*H04L 29/06* (2006.01)

(52) U.S. Cl.
CPC ......... *H04L 41/0893* (2013.01); *G06N 20/00* (2019.01); *H04L 43/028* (2013.01); *H04L 63/1425* (2013.01); *H04L 63/20* (2013.01)

(58) Field of Classification Search
CPC .............. H04L 41/0893; H04L 43/028; H04L 63/1425; H04L 63/20; G06N 20/00
See application file for complete search history.

(56) References Cited

U.S. PATENT DOCUMENTS

| 7,467,202 | B2 | 12/2008 | Savchuk |
| 9,680,742 | B2 | 6/2017 | Tompkins et al. |
| 10,243,980 | B2 | 3/2019 | Vasseur et al. |
| 10,321,318 | B2* | 6/2019 | Raleigh ................. H04W 12/00 |
| 10,469,511 | B2 | 11/2019 | Vasseur et al. |
| 10,498,752 | B2 | 12/2019 | Di Pietro et al. |
| 2020/0067935 | A1* | 2/2020 | Carnes, III ............ H04L 63/105 |

(Continued)

OTHER PUBLICATIONS

Alcock, et al., "Libprotoident: Traffic Classification Using Lightweight Packet Inspection", online: https://www.researchgate.net/publication/268404135_Libprotoident_Traffic_Classification_Using_Lightweight_Packet_Inspection, Jan. 2012, 8 pages, ResearchGate.

(Continued)

*Primary Examiner* — El Hadji M Sall
(74) *Attorney, Agent, or Firm* — Behmke Innovation Group LLC; Kenneth J. Heywood; James J. Wong

(57) ABSTRACT

In various embodiments, a device classification service receives, from a networking device in a network, an indication that deep packet inspection (DPI) trace data is not available for an endpoint device in the network because the endpoint device does not match any DPI policies of the networking device. The service configures a first DPI policy on the networking device that causes it to capture a DPI trace of traffic associated with the endpoint device. The service receives, via a user interface, an indication that a subset of attributes of the endpoint device in the DPI trace is relevant to labeling the endpoint device with a device type. The service replaces the first DPI policy on the networking device with a second DPI policy that causes it to report only the subset of attributes of endpoint devices to the device classification service for endpoint devices that match the second DPI policy.

20 Claims, 9 Drawing Sheets

(56) References Cited

U.S. PATENT DOCUMENTS

2020/0366717 A1* 11/2020 Chaubey ................ H04L 63/20
2020/0382376 A1* 12/2020 Savalle ................ H04L 63/108

OTHER PUBLICATIONS

Epstein, Brian, "Deep Packet Inspection is Dead, and Here's Why", online: https://security.ias.edu/deep-packet-inspection-dead-and-heres-why, Jun. 2017, 7 pages, IAS.

Epstein, Brian, "Deep Packet Inspection is Dead, and Here's Why", online: https://news.ycombinator.com/item?id=18910334, 2017, 17 pages, Hacker News.

Wan, et al., "A New Active Labeling Method for Deep Learning", 2014 International Joint Conference on Neural Networks (IJCNN), Jul. 2014, 8 pages, IEEE.

\* cited by examiner

LEARNING PACKET CAPTURE POLICIES TO ENRICH CONTEXT FOR DEVICE CLASSIFICATION SYSTEMS

TECHNICAL FIELD

The present disclosure relates generally to computer networks, and, more particularly, to learning packet capture policies to enrich context for device classification systems.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular device is known to the network. For example, the network may limit a particular type of sensor to only communicating with its supervisory device. Proper classification of an endpoint device, though, first requires sufficient information to be captured about the device. In carpeted environments, such as office buildings, this can be achieved by simply assessing the relevant traffic header information from protocols like HTTP or DHCP. However, in non-carpeted environment, such as factories, hospitals, etc., many of these same attributes become less available or are even absent, altogether.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
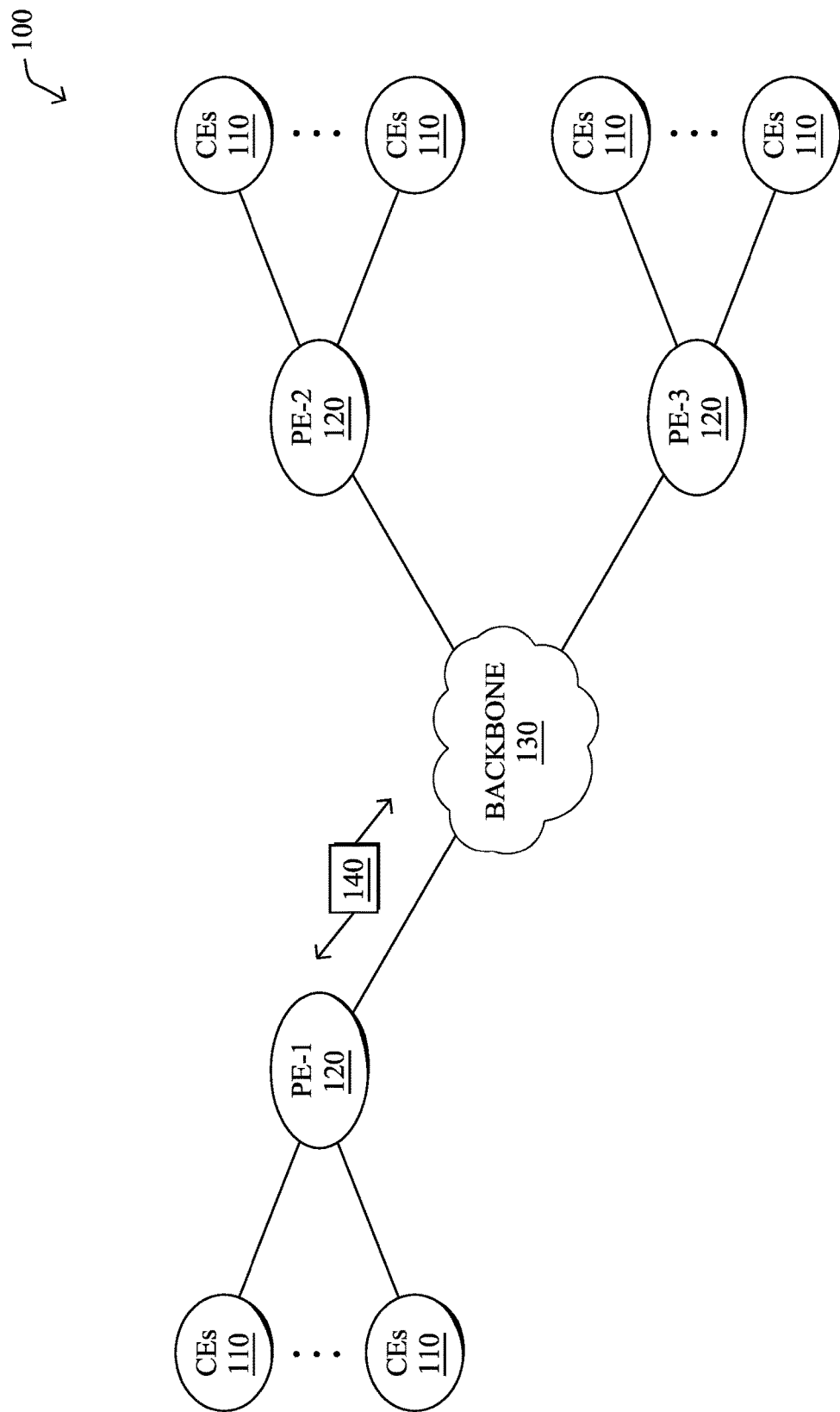
FIGS. 1A-1B illustrate an example communication network.

According to one or more embodiments of the disclosure, a device classification service receives, from a networking device in a network, an indication that deep packet inspection (DPI) trace data is not available for an endpoint device in the network because the endpoint device does not match any DPI policies of the networking device. The service configures a first DPI policy on the networking device that causes the networking device to capture a DPI trace of traffic associated with the endpoint device. The service receives, via a user interface, an indication that a subset of attributes of the endpoint device in the DPI trace is relevant to labeling the endpoint device with a device type. The service replaces the first DPI policy on the networking device with a second DPI policy that causes the networking device to report only the subset of attributes of endpoint devices to the device classification service for endpoint devices that match the second DPI policy.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
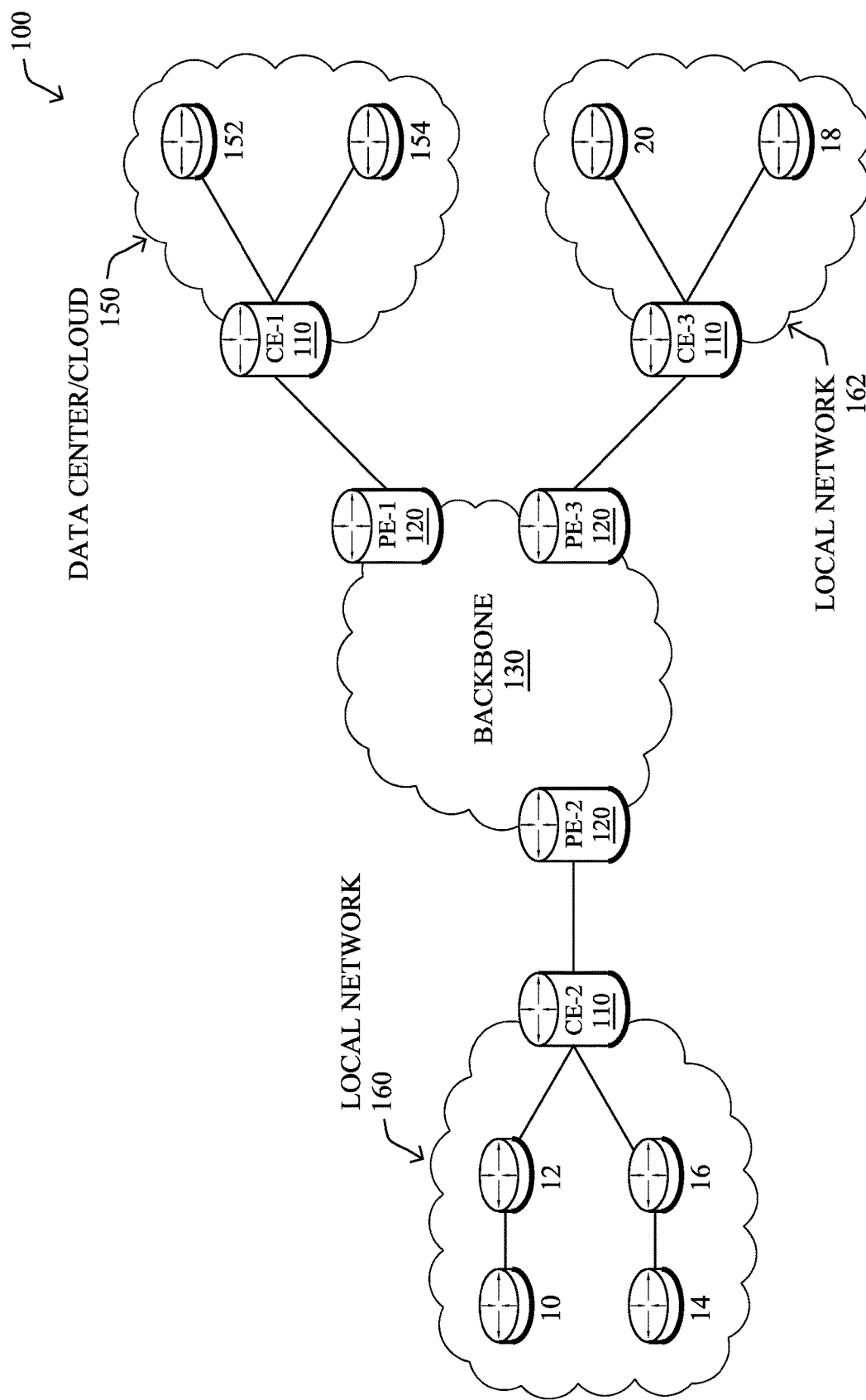

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
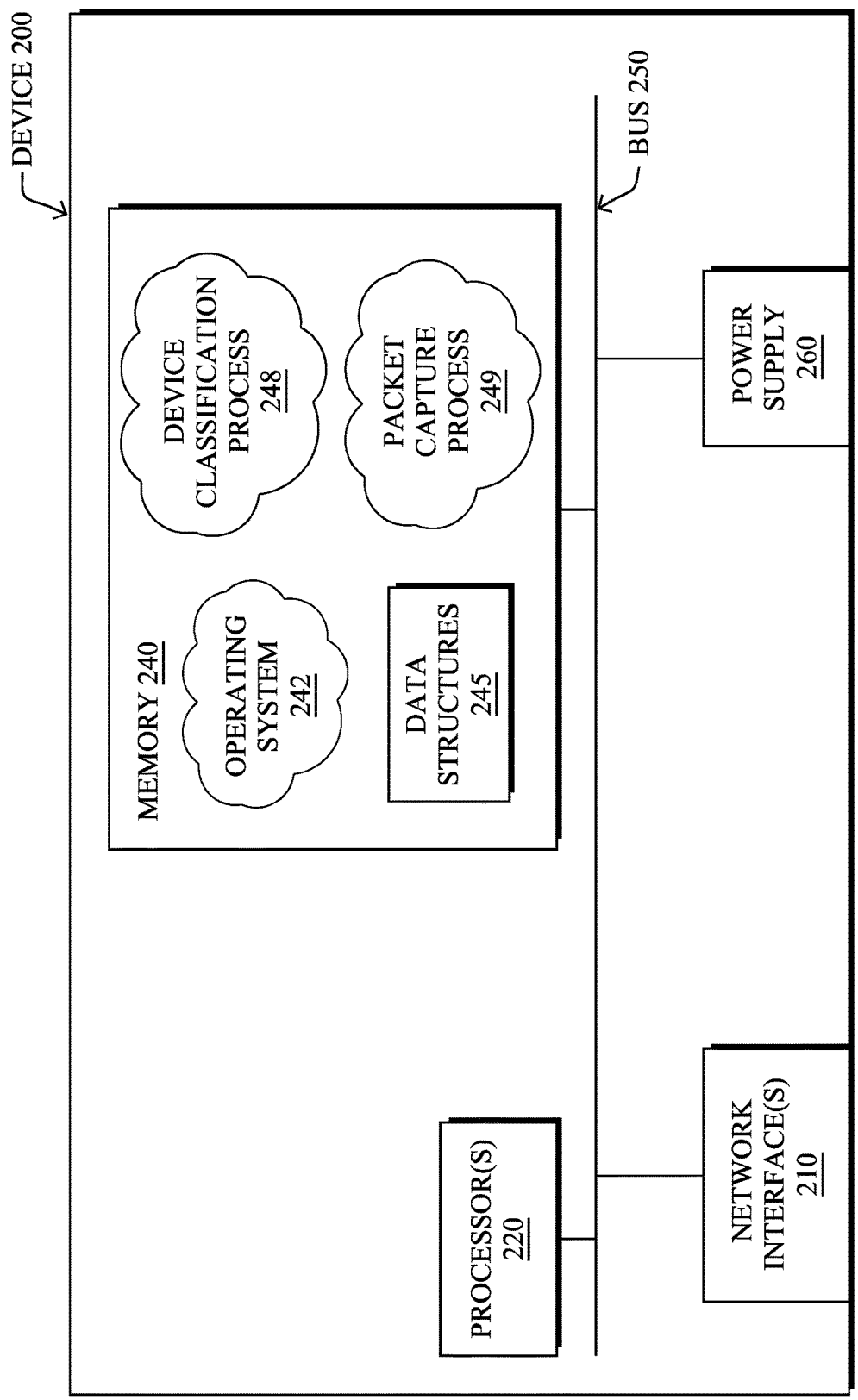
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248 and/or a packet capture process 249, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
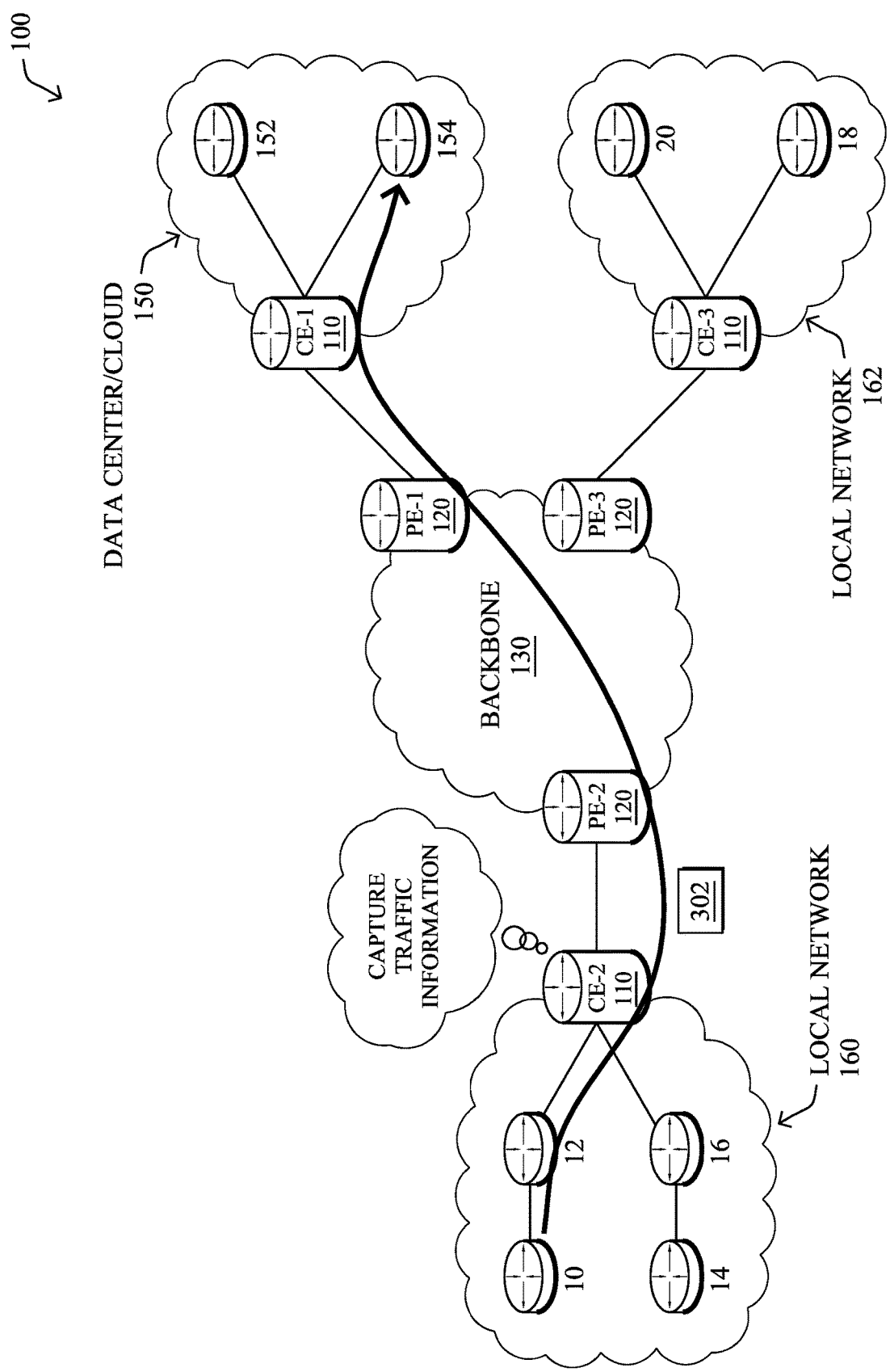
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture telemetry data about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example features in the captured telemetry data may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

Figure 4:
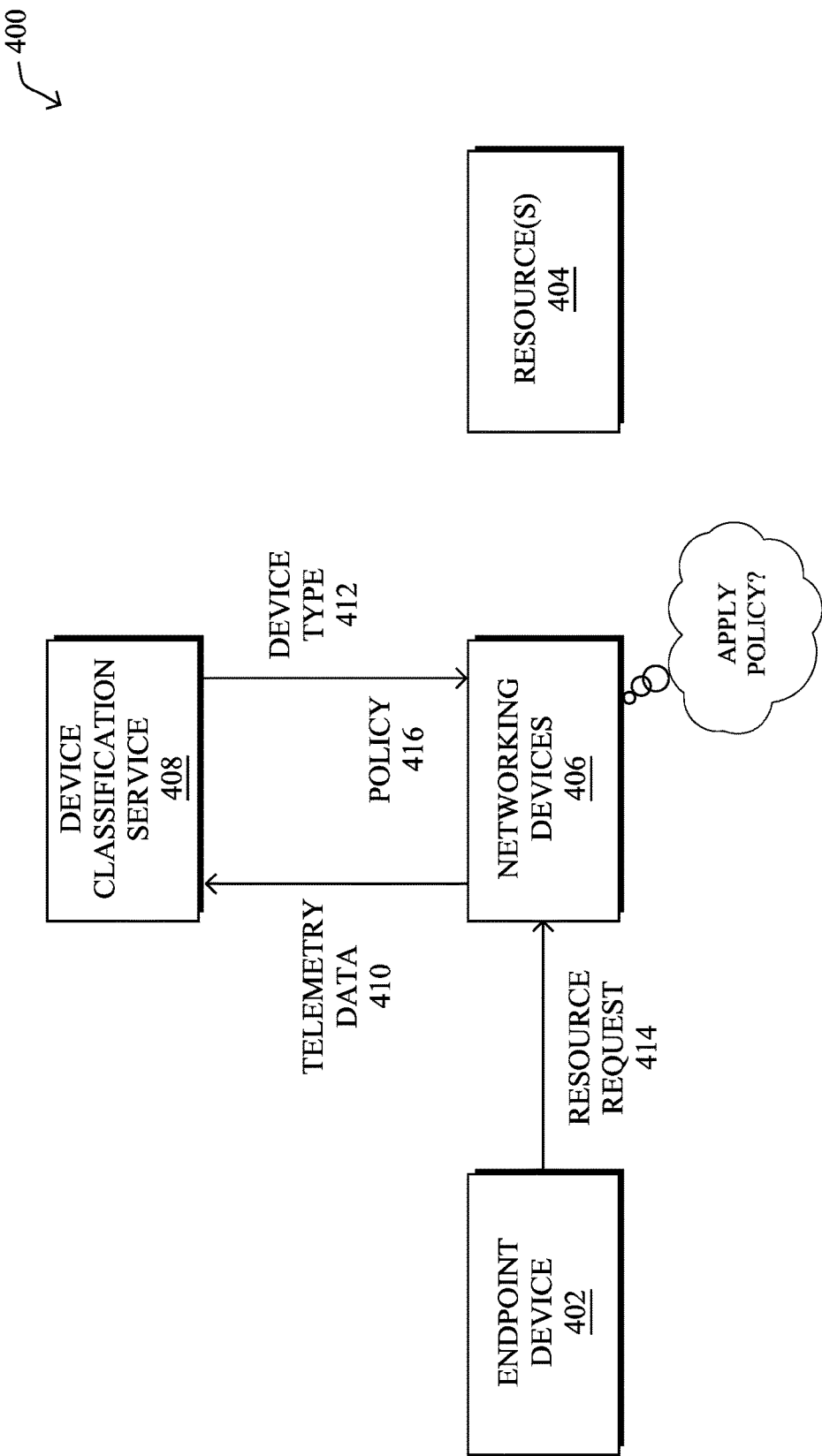
FIG. 4 illustrates an example of a device classification service in a network.

FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also as shown in FIG. 4 is a device classification service 408 that comprises one or more servers or other devices, such as networking devices 406, or be in communication therewith (e.g., in a data center, in the cloud, etc.). Service 408 may, for example, be provided through the execution of device classification process 248, described above. In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model/version (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy 416 associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:

DHCP probes with helper addresses
SPAN probes, to get messages in INIT-REBOOT and SELECTING states, use of ARP cache for IP/MAC binding, etc.
Netflow probes
HTTP probes to obtain information such as the OS of the device, Web browser information, etc.
RADIUS probes
SNMP to retrieve MIB object or receives traps
DNS probes to get the Fully Qualified Domain Name (FQDN)
etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

Figure 5:
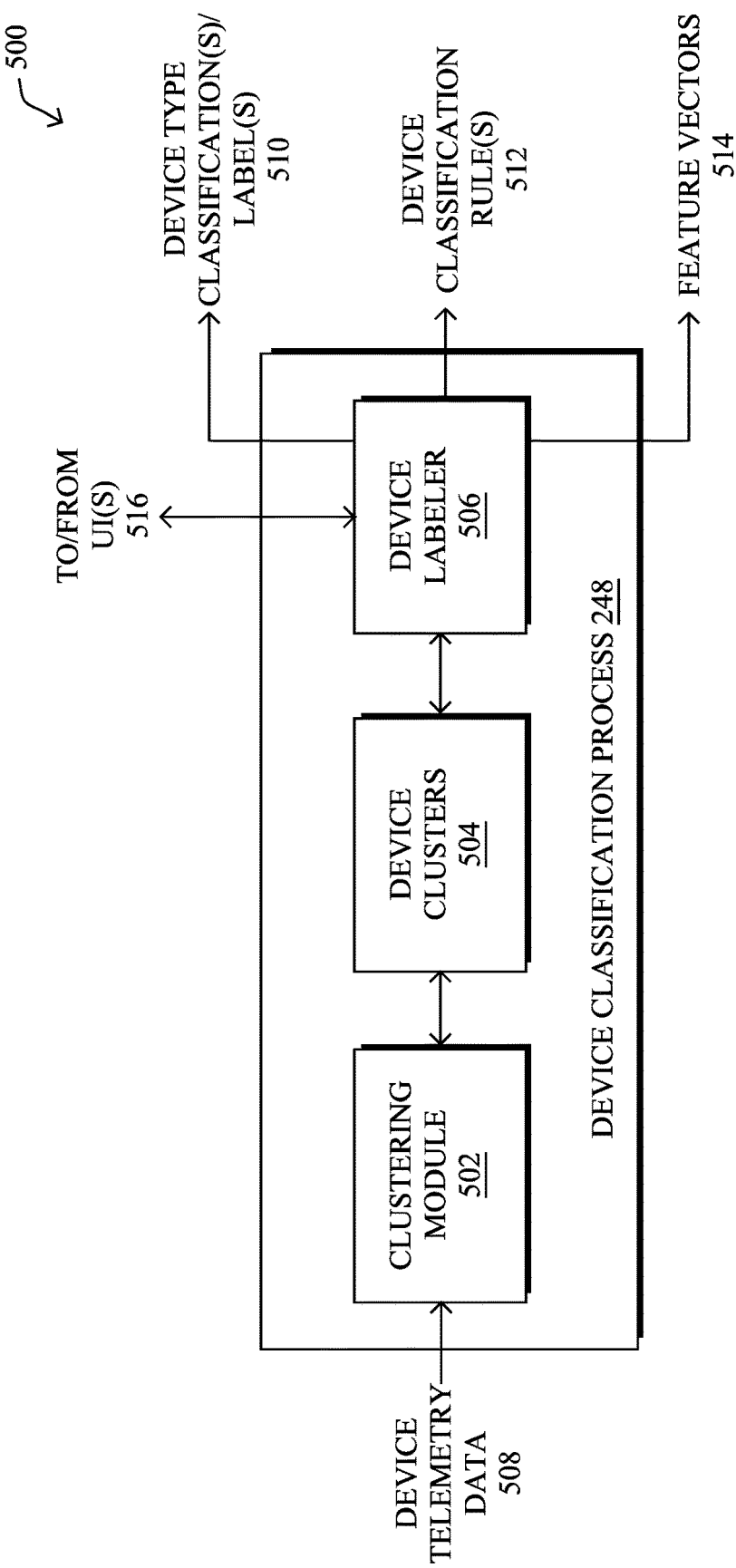
FIG. 5 illustrates an example architecture for a device classification process.

FIG. 5 illustrates an example architecture 500 for device classification process 248, according to various embodiments. As shown, device classification process 248 may include any or all of the following components: clustering module 502, device clusters 504, and/or a device labeler 506, to provide a device classification service to one or more networks. These components 502-506 may be implemented in a distributed manner or implemented on a single device. In addition, some or all of components 502-506 may be implemented as part of a monitored network (e.g., at the network edge) or part of a cloud-based device classification service. For example, in some implementations, a cloud-based device classification service may perform centralized rule generation for any number of networks that perform the classifications locally. The functionalities of the components of architecture 500 may also be combined, omitted, or implemented as part of other processes, as desired.

As shown, device classification process 248 may receive device telemetry data 508 regarding any number of devices undergoing device type classification. Such device telemetry data 508 may include, for example, the MAC addresses of the devices, traffic features captured from the devices' traffic (e.g., which protocols were used, source or destination information, etc.), timing information (e.g., when the devices communicate, sleep, etc.), and/or any other information regarding the devices that can be used to infer their device types. For example, device telemetry data 508 may take the form of a feature vector in which each dimension represents the presence or absence of a certain protocol in the traffic of the device such as, but not limited to, IPv6, IPv4, IGMPv3, IGMPv2, ICMPv6, ICMP, HTTP/XML, HTTP, etc.

In turn, device classification process 248 may output a device type classification/label 510 for a device under scrutiny, thereby allowing the receiving entity to apply network policies to the device, based on its device type classification(s)/label(s) 510. For example, one such network policy may cause a networking device to prevent an MRI machine from accessing the Internet or another resource via the network.

In various embodiments, the components 502-506 of device classification process 248 may leverage active learning, to assign device type classification(s)/label(s) 510 to the devices under scrutiny. To do so, clustering module 502 may assign the devices under scrutiny to device clusters 504, based on their telemetry data 508. For example, a device cluster 504 may include those devices that exhibit the same or similar traffic or other behavioral features. If a device type is then associated with a device cluster 504, device labeler 506 may apply that type to a device as device type classification/label 510. In cases in which device labeler 506 is unable to classify the cluster 504 with sufficient confidence, it may send a label request to one or more user interfaces (UIs) 516, seeking active labeling of that cluster. In other words, device classification process 248 may be configured to leverage active learning, to learn the labels of unknown devices over time. Note also that the pool of device telemetry data 508 may be from any number of networks and that device labeler 506 may seek labels for a device cluster 504 from any number of experts across any number of networks, as well. Once the cluster is labeled by an expert, device labeler 506 can then apply that label to any other devices that fall within that cluster, as well.

More formally, let $D=\{D_1, D_2, \ldots, D_N\}$ denote the set of devices seen on the one or more networks under analysis by device classification process 248, each of which is identified by its MAC address or another unique identifier. For every device $D_i$ at time t, clustering module 502 may construct a feature vector $X_{i,t}$ from the telemetry data 508 for the device. Clustering module 502 may then apply a clustering algorithm, such as DB-scan, k-means, k-medoids, etc., to create a set of device clusters 504. Let $C_t=\{C_{1,t}, \ldots, C_{K,t}\}$ denote these cluster, where $C_{j,t}$ is the $j^{th}$ set of devices clustered together at time t. As would be appreciated, the number of clusters K is typically smaller, or at most equal, to the number of points N, and the collection of clusters C defines a partition of the set of devices D. In doing so, each device represented in a device cluster 504 may exhibit similar behaviors/attributes as those of the other devices in its cluster.

Clustering module 502 may perform the device clustering periodically at a relatively high frequency (e.g., hourly) or at a lower frequency (e.g., weekly). Clustering module 502 can also produce subsequent clustering either by performing new clustering from scratch or by leveraging warm-starting techniques whereby $C_{t+1}$ is obtained by running the algorithm on data corresponding to that time point, but using an initialization based on $C_t$. Whether clustering module 502 uses warm-starting can have a large impact on the 'trajectory' of the clustering and is an important design consideration.

In various embodiments, device classification process 248 may also reclassify a device periodically, at a predefined time, or in response to a request to do so. For example, as the device under scrutiny uses the network, additional device telemetry data 508 can be captured. Generally speaking, the more telemetry data regarding the behavior of the device, the greater the accuracy of the resulting device type classification/label 510. Indeed, there may be slight behavioral differences between devices of different types, leading device classification process 248 to misclassify the device, initially, but correct this misclassification later on in time, as more information about the device becomes available.

According to various embodiments, device labeler 506 may also be configured to generate a device classification rule 512 for a given device cluster 504, based on its associated telemetry data 508, represented as positive and negative feature vectors 514, and the device type labels obtained from experts through active learning. For example, device labeler 506 may aggregate the labels obtained from the experts, to form a finalized device type classification label 510 for the device cluster 504, using any number of conditions (e.g., whether a threshold number of the labels agree, the majority of labels, etc.). In turn, device labeler 506 may associate this label with the telemetry data 508 representative of the device cluster 504, such as the centroid of the cluster, etc.

By generating a device classification rule 512, device labeler 506 can then use this rule to quickly assess the telemetry data for new devices on the network(s). In addition, device labeler 506 can also deploy device classification rule 512 to any number of Identity Service Engines (ISEs) and/or device classification services in the network(s), to perform the device classifications locally. This allows every new device appearing on the network and matching device classification rule 512 to be identified with the corresponding device type.

In practice, device classification rules 512 can be specified manually and/or automatically generated by device classification process 248. This leads to the very real possibility of at least some device classification rules 512 conflicting. For example, a manually-defined rule in a network under scrutiny may conflict with another rule that was automatically generated, other manually-defined rules in the network or other networks, etc.

For purposes of illustration, a device classification rule 512 may take the form of a pair (R, L) where R is a logical statement whose free variables are device attributes that specify whether the device type label L should be applied to a given device (e.g., if the attributes of the device satisfy R). Typically, the label L is a structured object of the form {manufacturer, hardware, software}, for instance, {Apple, iPhone 8, iOS 12.1.23}. In practice, R can be thought of as a low-dimensional manifold in the N-dimensional space spawned by all N attributes that a given device can have, such as its organizationally unique identifier (OUI), HTTP user agent, DHCP parameters, application usages, etc. For example, the following device classification rule 512 may label and endpoint device as an "Apple iPad," if the following conditions are met:

(OUI='Apple') && (DHCP-vendor-class-ID contains 'iPAD')

Figure 6:
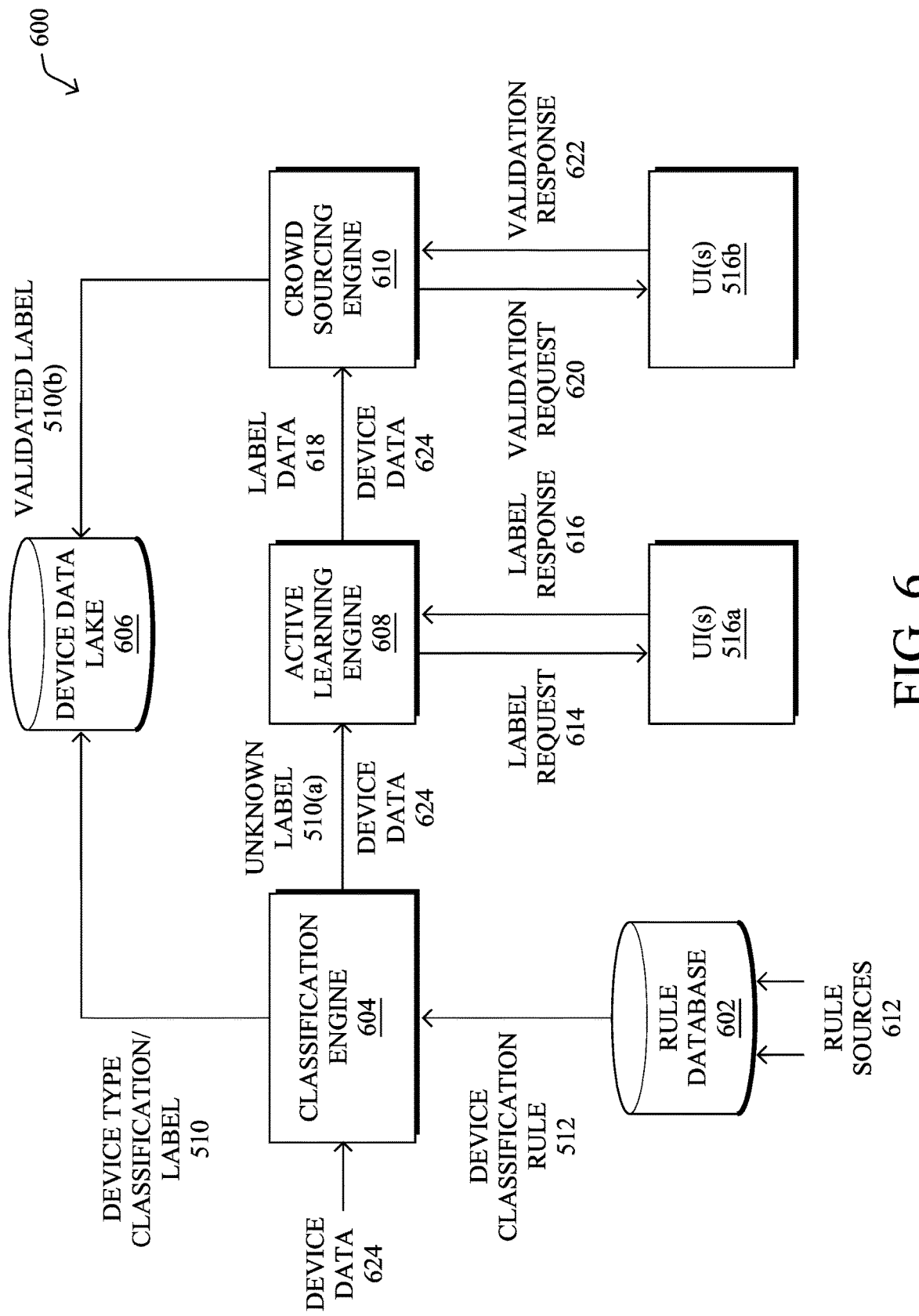
FIG. 6 illustrates an example architecture to label an endpoint device.

FIG. 6 illustrates an example architecture 600 to label an endpoint device, according to various embodiments. For instance, device labeler 506 in FIG. 5 may be implemented using architecture 600. As shown, architecture 600 may include any or all of the following components: a rule database 602, a classification engine 604, a device data lake 606, an active learning engine 608, and/or a crowd sourcing engine 610. As would be appreciated, these components may be executed on a singular device/apparatus (e.g., device 200) or in a distributed manner, in which case the set of executing devices, whether located in the network undergoing monitoring or in the cloud, may be viewed as a singular device implementing the techniques herein. In addition, the functionalities of these components may be combined or omitted, as desired, in further embodiments.

As shown, rule database 602 may function as a repository for device classification rule used in any number of networks to classify devices in those networks by their types. In some cases, at least a portion of the device classification rules in rule database 602 may be received from any number of rule sources 612, such as Fingerbank, Zingbox, Identity Services Engine (ISE) from Cisco Systems, Inc., or from any other services that may maintain their own pools of device classification rules. Typically, these rules are manually defined and curated by experts in their respective networks. In addition to, or in lieu thereof, rule database 602 may also include any device classification rule generated using machine learning, such as by leveraging the techniques described previously with respect to FIG. 5.

During execution, classification engine 604 may receive device data 624 regarding an endpoint device, such as its associated telemetry data or data derived therefrom, and attempt to match device data 624 to any of the device classification rules 512 from rule database 602. In further cases, device data 624 may also include any device cluster information for the endpoint device, if clustering was also performed by the device classification service. If there is a rule match, classification engine 604 may provide the resulting device classification/label 510 for the device for storage in device data lake 606. However, if device data 624 does not match any of the existing device classification rules 512, classification engine 604 may provide device data 624 and a device label 510(*a*) that indicates that the endpoint device is of an 'unknown' device type to active learning engine 608.

In general, active learning engine 608 functions to request manual labeling of an endpoint device or device cluster whose device type is unknown by the system. To this end, active learning engine 608 may send a label request 614 to a set of one or more UIs 516*a* that includes device data 624 (e.g., contextual data), thereby requesting the user(s) label the endpoint device or cluster with a type. In turn, active learning engine 608 may receive a label response 616 that labels the endpoint device or cluster as being of a particular type.

In some embodiments, architecture 600 may also leverage crowd sourcing for purposes of labeling endpoint devices or device clusters. For instance, as shown, crowd sourcing engine 610 may receive the label data 618 and device data 624 from label response 616 and send out a validation request 620 to any number of a set of UIs 516*b*. In turn, each user may send a validation response 622 that either validates or refutes the label supplied in label response 616. If the label is validated, crowd sourcing engine 610 may provide the validated label 510(*b*) for storage in device data lake 606, which can be used to apply one or more policies to the endpoint device based on its device type.

As noted above, one of the biggest challenges faced by a machine learning-based device classification system is the scarcity of data available to characterize the type of a device. Indeed, most attributes that can be used for device classification are available in very common devices, such as laptops, smartphones, or workstations, and captured by, extracting relevant headers from protocols such as HTTP (e.g., the 'user-agent' field) or DHCP (e.g., parameter request list, class identifier). However, when operating in non-carpeted environments (e.g., factory floor, hospital rooms, retail), many of these attributes may become less accurate or absent, altogether. This is also true in certain environments where inspecting the traffic may reveal interesting properties that can drastically help identify the device type. In these circumstances, it is important to provide more details to the user for the identification of such devices, especially in the context of an active labeling workflow whereby information is presented to a user and.

Learning Packet Capture Policies to Enrich Context for Device Classification

The techniques herein introduce a mechanism that consists in performing, both upon request or in an automated fashion, deep packet inspection (DPI) of traffic associated with an endpoint device, whereby the results are stored and eventually, presented to a user for purposes of labeling the endpoint device. In some aspects, the techniques herein are able to learn a set of policies that determine when it is appropriate to perform packet inspection, how long to store the results, and even to reduce the scope of the inspection to only some protocols, based on existing attributes of the endpoint device.

Specifically, according to various embodiments herein, a device classification service receives, from a networking device in a network, an indication that deep packet inspection (DPI) trace data is not available for an endpoint device in the network because the endpoint device does not match any DPI policies of the networking device. The service configures a first DPI policy on the networking device that causes the networking device to capture a DPI trace of traffic associated with the endpoint device. The service receives, via a user interface, an indication that a subset of attributes of the endpoint device in the DPI trace is relevant to labeling the endpoint device with a device type. The service replaces the first DPI policy on the networking device with a second DPI policy that causes the networking device to report only the subset of attributes of endpoint devices to the device classification service for endpoint devices that match the second DPI policy.

Illustratively, the techniques described herein may be performed by hardware, software, and/or firmware, such as in accordance with device classification process 248 and/or packet capture process 249, which may include computer executable instructions executed by the processor 220 (or independent processor of interfaces 210) to perform functions relating to the techniques described herein.

Figure 7:
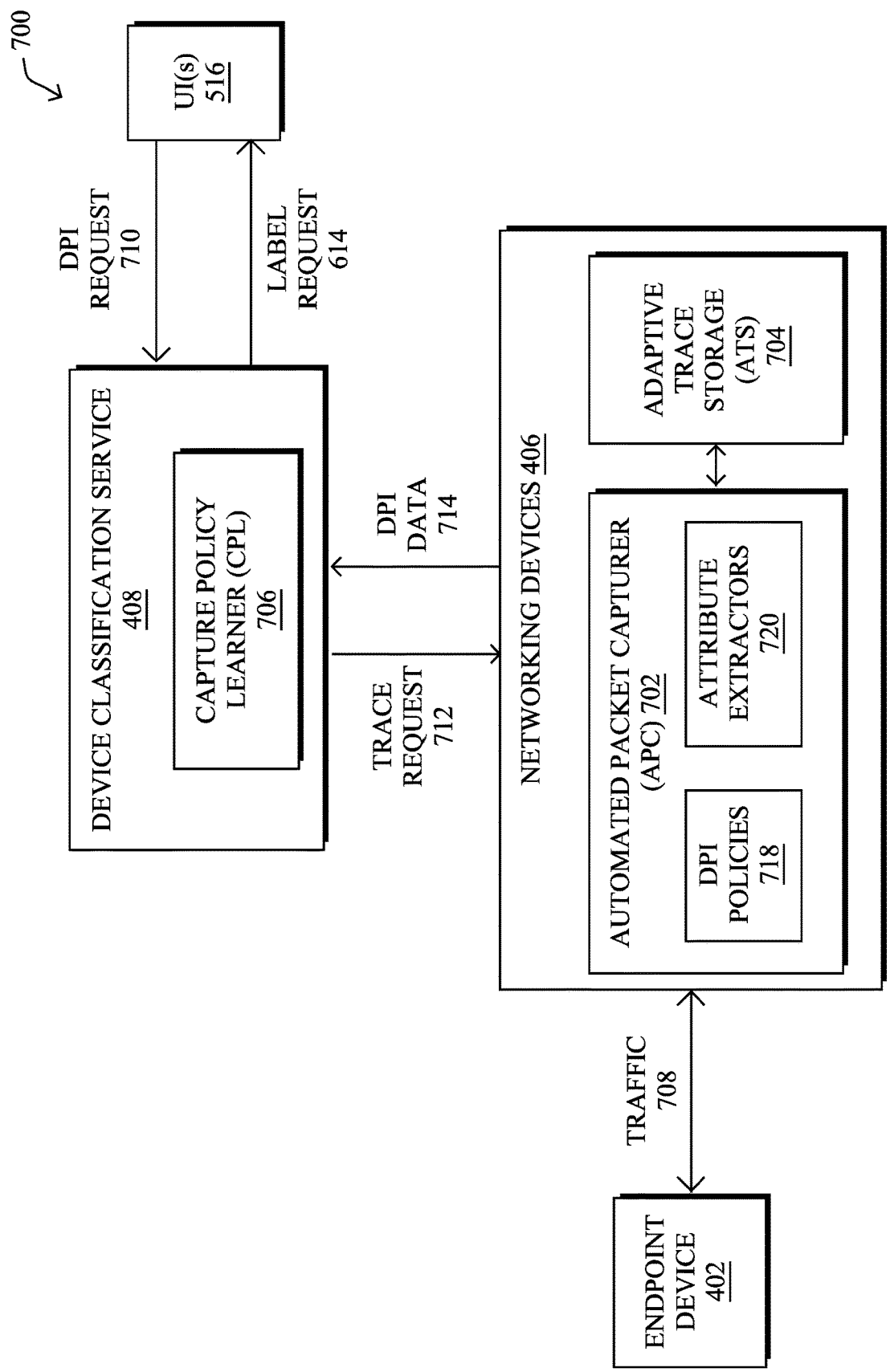
FIG. 7 illustrates an example architecture to learn and apply a packet capture policy for device classification.

Operationally, FIG. 7 illustrates an example architecture to learn and apply a packet capture policy for device classification, according to various embodiments. Continuing the examples previously described with respect to FIGS. 4-6, again assume that there is an endpoint device 402 that joins a network in which a networking device 406 is located (e.g., a router, switch wireless controller, wireless access point, or the like). In various embodiments, the packet capture techniques introduced herein can be implemented by augmenting the system with the following components: an automated packet capturer (APC) 702, an adaptive trace storage (ATS) 704, and/or a capture policy learner (CPL) 706). As would be appreciated, the functionalities of these components can be combined or omitted, in various embodiments.

As shown, APC 702 may be executed on a networking device 406 in the local network of endpoint device 402. During execution, APC 702 takes as input a set of DPI policies 716 and implements them with respect to the network traffic traversing networking device 406. For instance, APC 702 may capture packets of traffic 708 associated with endpoint device 402, based on one of its DPI policies 716. In general, DPI policies 716 may be of a similar form to the device classification rules used by device classification service 408 itself, in that they may consist of logical statements whose free variables are device attributes, and a description of the packet capture session to be executed. For instance, a DPI policy 716 leveraged by APC 702 may specify any or all of the following:

- Protocols: a list of protocols for which packets should be captured. In some instances, this can be set using a wildcard to cause APC 702 to capture packets for all protocols or a subset of protocols of a certain type.
- MaxDuration: the maximal duration of the packet capture session.
- MaxBytes: the maximal number of bytes that may be captured in a given session.
- Extractors: optionally, the policy may also specify a list of attribute extractors 718, which may take the form of lambda functions (in any language), to be executed by APC 702 on the packet trace and return a set of key-value pairs in the form of attributes.

When no extractors are specified in a DPI policy 716, APC 702 may perform a raw packet capture and provide the results to ATS 704. Of course, raw packet traces are much bigger than extracted attributes but, conversely, are also more informative for an end user when providing a device type label. In cases in which a DPI policy 716 specifies one or more attribute extractors 718, APC 702 may apply them to the packet capture and provide the extracted attributes directly to device classification service 408 as DPI data 714.

ATS 704 may also be executed on networking device 406 and serve to store the raw packet traces captured by APC 702, in various embodiments. Typically, ATS 704 will have either a maximal storage capacity or it may adapt this capacity as a function of the available resources on networking device 402 (e.g., available memory, flash, etc.). ATS 704 receives the trace data from APC 702, store them in a local database along with a descriptor D of the corresponding endpoint (e.g., the MAC address of endpoint device 402 and the common attributes used by device classification service 408). ATS 704 can be dynamically queried by device classification service 408, such as via a trace request 712, in order to return: 1.) the trace of a given endpoint device, as identified by its MAC address or 2.) one or more traces of endpoint devices that match a given device classification rule, as DPI data 714.

One of the key functionalities of ATS 704 is its ability to learn from previous trace requests whether a given trace is likely to be queried by device classification service 408. Indeed, given the descriptor D of an endpoint device, ATS 704 may build a model M whose goal is to predict the relevance of the corresponding trace, which may be inferred from the number of times queries were issued for similar endpoint devices. In simpler embodiments, M may be replaced by simple heuristics, such that the relevance is inversely proportional to the number of attributes that are available for the endpoint device. In practice, such simplistic heuristics are unlikely to be as effective, as the actual content of the attributes is often more important to determine whether they are sufficient to identify a given endpoint device.

Based on its model, ATS 704 may prioritize the deletion of traces upon hitting its maximal storage capacity (e.g., a maximal storage value), starting with traces that are the least likely to be requested by device classification service 408 in the future. In some cases, ATS 704 may even drop traces immediately upon reception, if its model M is very confident that they will not be queried. If multiple traces have equal likelihood to be queried, ATS 704 may also prioritize the deletion of the biggest traces first.

Regardless, on receiving a trace request 712 that that cannot satisfy for a particular endpoint device, ATS 704 may register a scheduled capture by APC 702. In turn, ATS 704 may forward the next packet trace that it receives from APC 702 that matches the trace request 712 as DPI data 714.

In some embodiments, the model M of ATS 704 may be trained centrally, such as by device classification service 408, which may typically be located in the cloud, from the aggregated data of a large number of ATS components executed across one given network, or even multiple networks. In this embodiment, every ATS may regularly send a dataset that consists in pairs (D, L) where D is the descriptor of an endpoint and L is a label that indicates whether the endpoint has been queried. In further embodiments, the time from the capture to the query can also be provided, which may be infinite, in some cases. These datasets are then aggregated, and a global model $M_g$ is trained and broadcasted back to every individual ATS.

A further component of architecture 700 may be capture policy learner (CPL) 706, which is centrally hosted, such as part of device classification service 408. In some instances, when device classification service 408 sends a label request 614 to UI(s) 516 requesting that one or more users label an endpoint device or device cluster with a device type, the user may respond with a DPI request 710 for additional information regarding the endpoint device(s) that can be captured via DPI. In various embodiments, CPL 706 may learn policies from these DPI request that it can then push to the APC components in the network.

In response to DPI request 710, CPL 706 may send a corresponding trace request 712 to the APC components in the network. For instance, assume that the user of UI 516 requests DPI information regarding endpoint device 402, to aid in the labeling thereof. In such a case, CPL 706 may send trace request 712 to APC 702 on networking device 406. At this point, three scenarios are possible:

A DPI policy 716 already existed that matched endpoint device 402 and the trace has been conserved by ATS 704. In this case, ATS 704 will then return the trace as DPI data 714.

A DPI policy 716 already existed that matched endpoint device 402, but the trace has been discarded by ATS 704. In this case, ATS 704 may return an indication to CPL 706 that the trace was deleted (e.g., via a <Trace_Deleted> message).

No DPI policy 716 existed on networking device 406 that matched endpoint device 402. Hence, ATS 704 never received a trace for endpoint device 402. In this case, ATS 704 may return an indication to CPL 706 that no trace for endpoint device 402 ever existed, since it did not match any of DPI policies 716 (e.g., via a <No_Policy>message).

Depending on the results of trace request 712, various outcomes are possible. If ATS 704 has a DPI trace stored for endpoint device 402, CPL 706 may provide the trace results to UI 516 for review by the user, to aid in the labeling task. However, if ATS 704 previously deleted the DPI trace for endpoint device 402, CPL 706 may inform the user that the requested DPI trace is unavailable, but that another DPI session is scheduled for endpoint device 402 and/or a similar endpoint device that exhibits similar characteristics. However, if no DPI trace was ever captured for endpoint device 402 because it did not match any of DPI policies 716, CPL 706 may trigger the creation of a new DPI policy 716 on APC 702. This initial policy will be typically quite extensive, potentially using a wildcard on protocols and no attribute extractors. In turn, CPL 706 may provide the resulting coarse-grained DPI trace data for endpoint device 402 to UI 516 for review.

Although the initial DPI policy and DPI trace for endpoint device 402 may be very coarse-grained when a corresponding DPI policy 716 did not match endpoint device 402, a key functionality introduced herein is the ability for the user(s) of UI(s) 516 to specify which portions of the coarse-grained DPI trace are considered relevant, in some embodiments. To this end, CPL 706 may allow the user(s) to browse through the trace interactively, extract attributes of interest h highlighting them in the trace, and finally define classification rules based on those attributes.

These interactions are a very rich source of information, from which the CPL 706 may infer that, for a given type of device, as identified by its classical attributes, only a small fraction of the protocols is required. As a result, CPL 706 may then refine the existing DPI policy 716 by introducing a filter on the protocols to be captured, in this way optimizing the storage needed by ATS 704 for the collected traces. When multiple users are creating rules based on extracted attributes, CPL 706 may even go as far as adding an attribute extractor to the DPI policy 716 so that APC 702 no longer provides a full trace, but directly extract the relevant attributes, which are then directly forwarded to device classification service 408 for classification purposes.

A further functionality in architecture 700 may be the triggering of a new active labeling cycle based on new feedback provided by the users) via UI(s) 516 regarding the packet traces for a given set of endpoint devices whose types are 'unknown.' Such information is then used by device classification service 408 to re-cluster all 'unknown' devices using the new fields flagged in the trace as relevant by the end user(s). Note that this information can also be used by device classification service 408 to aid in the classification of devices across any number of different networks by monitoring the impact on the number of device clusters, as well as the ability to reduce the number of unknown devices using the new field(s).

Figure 8:
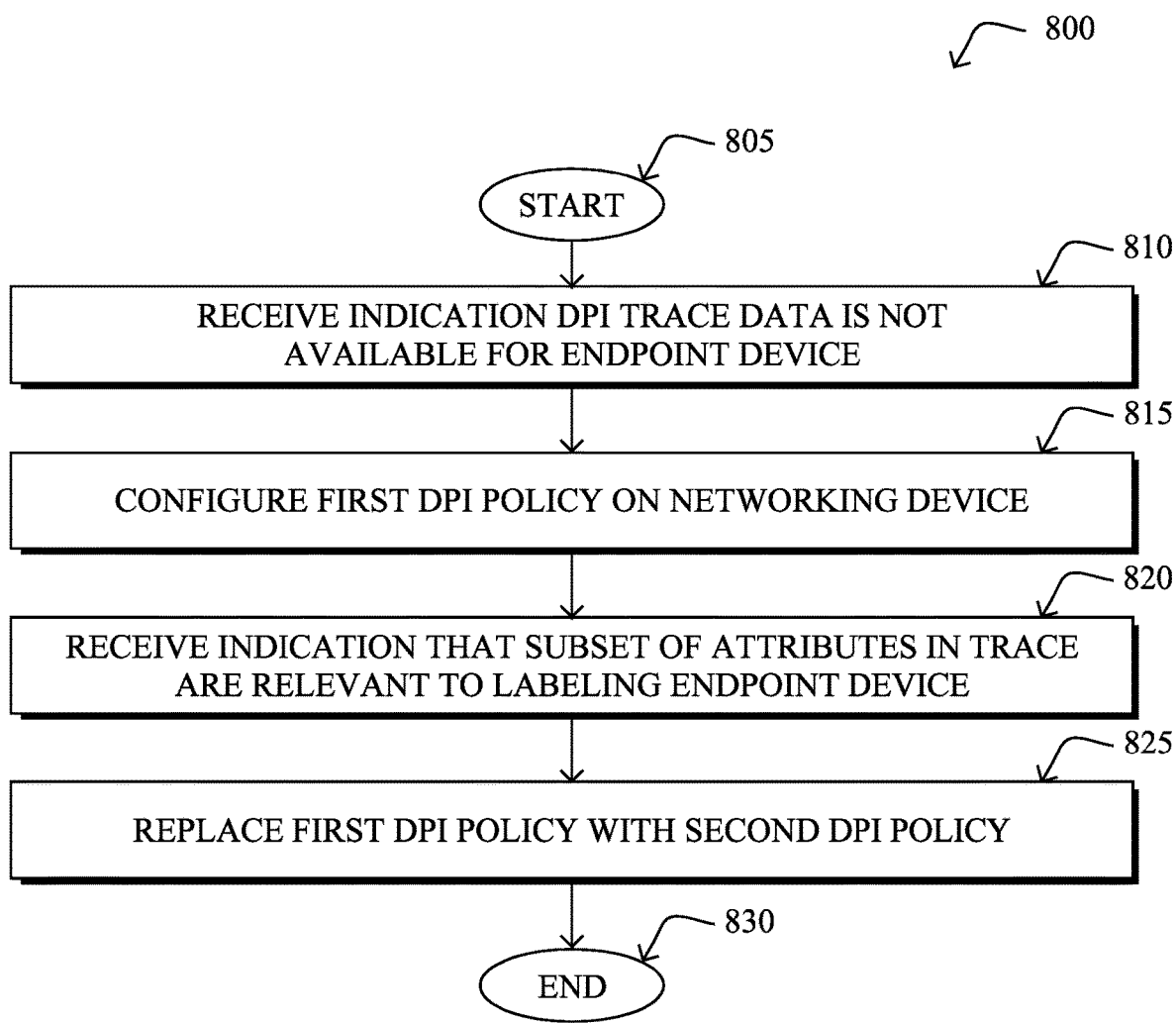
FIG. 8 illustrates an example simplified procedure for implementing a packet capture policy for device classification.

FIG. 8 illustrates an example simplified procedure for implementing a packet capture policy for device classification, in accordance with one or more embodiments described herein. For example, a non-generic, specifically configured apparatus (e.g., device 200) may perform procedure 800 by executing stored instructions (e.g., device classification process 248 and/or packet capture policy 249), to operate as a device classification service for one or more networks. The procedure 800 may start at step 805, and continues to step 810, where, as described in greater detail above, the device classification service may receive, from a networking device in a network (e.g., a router, switch, wireless AP, wireless AP controller, etc.), an indication that DPI trace data is not available for an endpoint device in the network because the endpoint device does not match any DPI policies of the networking device. In some embodiments, the service may receive this indication in response to sending a request to the networking device for DPI trace data for the endpoint device and after making a determination that the endpoint device is of an unknown device type based on telemetry data captured regarding the endpoint device. For instance, if the device classification service is unable to determine the type of the endpoint device based on its standard telemetry, it may seek additional DPI data regarding the traffic of the endpoint device in an effort to help do so. In further embodiments, the service may first attempt to send a labeling request to a UI that requests a device type label for the endpoint device and, in response, receive a DPI trace request regarding the endpoint device that causes the service to request the DPI trace data for the endpoint device.

At step 815, as detailed above, the device classification service may configure a first DPI policy on the networking device that causes the networking device to capture a DPI trace of traffic associated with the endpoint device. In various embodiments, the first DPI policy may be coarse-grained and capture a wide variety of protocols and other information from the packets and traffic associated with the endpoint device, such as by using wildcards for protocols or other attributes in the policy.

At step 820, the device classification service may receive, via the UI, an indication that a subset of the attributes of the endpoint device in the DPI trace is relevant to labeling the endpoint device with a device type, as described in greater detail above. Indeed, after the first DPI policy is installed at the networking device, it may capture a DPI trace for the endpoint device that can be sent to the UI for review. In turn, the user may specify which of the attributes of the endpoint device that were captured in the trace that he or she deems relevant to the classification task.

At step 825, as detailed above, the device classification service may replace the first DPI policy on the networking device with a second DPI policy that causes the networking device to report only the subset of attributes of endpoint devices to the device classification service for endpoint devices that match the second DPI policy. In general, the second policy may be more fine-grained than the first policy, thereby collecting only certain information from the packets and traffic associated with the endpoint device, such as the attributes deemed by the user of the UI as relevant to the device classification/labeling task. In some embodiments, the second DPI policy specifies at least one of: a set of protocols that should be captured, a maximal duration for a packet capture session, a maximal number of bytes to be captured in a packet capture session, or one or more functions to be performed on a packet trace to extract the subset of attributes. In some embodiments, the service may also train a machine learning model to predict when the device classification service will query the networking device for DPI trace data and send the model to the networking device, which may decide whether to store DPI trace data based on a prediction by the machine learning model that the device classification service will query the networking device for that DPI trace data. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for packet captures and DPI to be leveraged by a device classification service, while minimizing the overhead in doing so. In some aspects, the collection and storage of the resulting traces can be adapted using machine learning to predict when such information may be queried. In further aspects, the techniques herein are also able to learn over time which attributes in a trace are actually relevant to the device classification task, so as to reduce the amount of data that needs to be stored.

While there have been shown and described illustrative embodiments that provide for learning packet capture policies to enrich device classification systems, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a device classification service and from a networking device in a network, an indication that deep packet inspection (DPI) trace data is not available for an endpoint device in the network because the endpoint device does not match any DPI policies of the networking device;
configuring, by the device classification service, a first DPI policy on the networking device that causes the networking device to capture a DPI trace of traffic associated with the endpoint device;
receiving, at the device classification service and via a user interface, an indication that a subset of attributes of the endpoint device in the DPI trace is relevant to labeling the endpoint device with a device type; and
replacing, by the device classification service, the first DPI policy on the networking device with a second DPI policy that causes the networking device to report only the subset of attributes of endpoint devices to the device classification service for endpoint devices that match the second DPI policy.

2. The method as in claim 1, further comprising:
sending, by the device classification service, a request to the networking device for DPI trace data for the endpoint device, after making a determination that the endpoint device is of an unknown device type based on telemetry data captured regarding the endpoint device, wherein the device classification service receives the indication that the DPI trace data is not available for the endpoint device in response to the request.

3. The method as in claim 1, further comprising:
sending a labeling request to the user interface that requests a device type label for the endpoint device; and
receiving, in response to the labeling request and from the user interface, a DPI trace request regarding the endpoint device.

4. The method as in claim 1, wherein the second DPI policy specifies at least one of: a set of protocols that should be captured, a maximal duration for a packet capture session, a maximal number of bytes to be captured in a packet capture session, or one or more functions to be performed on a packet trace to extract the subset of attributes.

5. The method as in claim 1, further comprising:
training, by the device classification service, a machine learning model to predict when the device classification service will query the networking device for DPI trace data; and sending, by the device classification service, the machine learning model to the networking device.

6. The method as in claim 5, wherein the networking device decides whether to store DPI trace data based on a prediction by the machine learning model that the device classification service will query the networking device for that DPI trace data.

7. The method as in claim 1, wherein the networking device comprises one of: a router, a switch, a wireless access point, or a controller for a wireless access point.

8. The method as in claim 1, further comprising:
applying clustering to endpoint devices in the network to form device clusters, based on the subset of attributes.

9. The method as in claim 1, wherein the networking device is configured to delete DPI trace data based on a maximal storage value.

10. An apparatus, comprising:
one or more network interfaces;
a processor coupled to the one or more network interfaces and configured to execute one or more processes; and
a memory configured to store a process that is executable by the processor, the process when executed configured to:
receive, from a networking device in a network, an indication that deep packet inspection (DPI) trace data is not available for an endpoint device in the network because the endpoint device does not match any DPI policies of the networking device;
configure a first DPI policy on the networking device that causes the networking device to capture a DPI trace of traffic associated with the endpoint device;
receive, via a user interface, an indication that a subset of attributes of the endpoint device in the DPI trace is relevant to labeling the endpoint device with a device type; and
replace the first DPI policy on the networking device with a second DPI policy that causes the networking device to report only the subset of attributes of endpoint devices to the apparatus for endpoint devices that match the second DPI policy.

11. The apparatus as in claim 10, wherein the process when executed is further configured to:
send a request to the networking device for DPI trace data for the endpoint device, after making a determination that the endpoint device is of an unknown device type based on telemetry data captured regarding the endpoint device, wherein the apparatus receives the indication that the DPI trace data is not available for the endpoint device in response to the request.

12. The apparatus as in claim 10, wherein the process when executed is further configured to:
send a labeling request to the user interface that requests a device type label for the endpoint device; and
receive, in response to the labeling request and from the user interface, a DPI trace request regarding the endpoint device.

13. The apparatus as in claim 10, wherein the second DPI policy specifies at least one of: a set of protocols that should be captured, a maximal duration for a packet capture session, a maximal number of bytes to be captured in a packet capture session, or one or more functions to be performed on a packet trace to extract the subset of attributes.

14. The apparatus as in claim 10, wherein the process when executed is further configured to:
train a machine learning model to predict when the apparatus will query the networking device for DPI trace data; and
send the machine learning model to the networking device.

15. The apparatus as in claim 14, wherein the networking device decides whether to store DPI trace data based on a prediction by the machine learning model that the apparatus will query the networking device for that DPI trace data.

16. The apparatus as in claim 10, wherein the networking device comprises one of: a router, a switch, a wireless access point, or a controller for a wireless access point.

17. The apparatus as in claim 10, wherein the process when executed is further configured to:
apply clustering to endpoint devices in the network to form device clusters, based on the subset of attributes.

18. The apparatus as in claim 10, wherein the networking device is configured to delete DPI trace data based on a maximal storage value.

19. A tangible, non-transitory, computer-readable medium storing program instructions that cause a device classification service to execute a process comprising:
receiving, at the device classification service and from a networking device in a network, an indication that deep packet inspection (DPI) trace data is not available for an endpoint device in the network because the endpoint device does not match any DPI policies of the networking device;
configuring, by the device classification service, a first DPI policy on the networking device that causes the networking device to capture a DPI trace of traffic associated with the endpoint device;
receiving, at the device classification service and via a user interface, an indication that a subset of attributes of the endpoint device in the DPI trace is relevant to labeling the endpoint device with a device type; and
replacing, by the device classification service, the first DPI policy on the networking device with a second DPI policy that causes the networking device to report only the subset of attributes of endpoint devices to the device classification service for endpoint devices that match the second DPI policy.

20. The computer-readable medium as in claim 19, wherein the networking device comprises one of: a router, a switch, a wireless access point, or a controller for a wireless access point.

* * * * *

UNITED STATES PATENT AND TRADEMARK OFFICE
CERTIFICATE OF CORRECTION

Page 1 of 1

PATENT NO. : 11,018,943 B1
APPLICATION NO. : 16/878931
DATED : May 25, 2021
INVENTOR(S) : Jean-Philippe Vasseur It is certified that error appears in the above-identified patent and that said Letters Patent is hereby corrected as shown below:

In the Specification

Column 16, Line 5, please amend as shown:
the trace interactively, extract attributes of interest by high- Column 16, Line 23, please amend as shown:
feedback provided by the user(s) via UI(s) 516 regarding the Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*